United States Patent
Groulx et al.

[19]

[11] Patent Number: 5,897,900
[45] Date of Patent: Apr. 27, 1999

[54] EDIBLE BUN HAVING A COMPARTMENTED CENTRAL RECESS

[76] Inventors: Line Groulx; Alain Groulx, both of 1171 Bérard, Mascouche, Québec, Canada, J7K 2J3

[21] Appl. No.: 08/658,064

[22] Filed: Jun. 4, 1996

[51] Int. Cl.$^6$ .............................. A21D 13/00; A21D 8/00
[52] U.S. Cl. .............................. 426/138; 426/92; 426/94; 426/280; 426/391; 426/496
[58] Field of Search .................. 426/138, 391, 426/92, 94, 280, 496; 249/122–125, 142; 99/353, 439, 428, 441

[56] References Cited

U.S. PATENT DOCUMENTS

| | | | |
|---|---|---|---|
| 1,529,670 | 3/1925 | Pritchard et al. | 426/139 |
| 1,543,650 | 6/1925 | Lyons | 426/138 |
| 1,569,121 | 1/1926 | Hall | 426/138 |
| 1,589,850 | 6/1926 | Haskell | 426/138 |
| 1,600,191 | 9/1926 | Mandelbaum | 426/138 |
| 1,690,882 | 11/1928 | Wear | 426/391 |
| 1,696,343 | 12/1928 | Burdick | 426/391 |
| 1,726,946 | 9/1929 | Burdick | 426/138 |
| 1,738,301 | 12/1929 | Kornreich | 249/125 |
| 1,816,283 | 7/1931 | Holibaugh | 426/138 |
| 1,984,027 | 12/1934 | Lyons | 99/428 |
| 2,018,950 | 10/1935 | Couture | 99/428 |
| 2,051,682 | 8/1936 | Couture | 426/138 |
| 2,222,112 | 11/1940 | Miller | 99/428 |
| 2,810,338 | 10/1957 | Dawson | 426/138 |
| 3,341,167 | 9/1967 | Weiss | 426/391 |
| 3,899,603 | 8/1975 | Brodie | 426/138 |
| 3,908,022 | 9/1975 | Selleck | 426/138 |
| 4,047,477 | 9/1977 | Berke | 99/428 |
| 4,065,581 | 12/1977 | Heiderpriem | 426/138 |
| 4,190,229 | 2/1980 | Bradshaw | 249/142 |
| 4,214,517 | 7/1980 | Caldwell | 426/138 |

FOREIGN PATENT DOCUMENTS

| | | | |
|---|---|---|---|
| 600072 | 6/1960 | Canada | 426/138 |

*Primary Examiner*—Steven Weinstein

[57] ABSTRACT

An edible bun having a substantially elongated configuration. The bun has a base wall, a pair of integrally extending side walls and a pair of integrally extending end walls. The base walls, the side walls and the end walls define an open top food receiving cavity. Each side wall has a lower section and an upper section. The thickness of the upper section is relatively smaller than the thickness of the corresponding lower section. The open-top food receiving cavity is thus generally divided into two superposed compartments. The lower compartment is typically adapted to receive a sausage while the upper compartment is adapted to receive conventional condiments. The upper peripheral edge of the upper section preferably has an inwardly oriented retaining lip. The upper sections of the side walls are bendable between an opened configuration wherein the retaining lips are spaced relatively to one another and a closed configuration wherein the retaining lips are adapted to prevent the condiments from spilling out of the bun. The present invention also proposes a baking mold for manufacturing the buns. The baking mold has a base portion provided with a set of spaced apart female mold recesses and a lid portion provided with a lid cover plate and a set of male shaping members. The male shaping members are adapted to be inserted inside the corresponding female mold recesses when the lid portion is superposed on the base portion. Each male shaping member and its corresponding female mold recess is adapted to create a mold cavity for forming a bun having a compartmented central food receiving cavity.

4 Claims, 7 Drawing Sheets

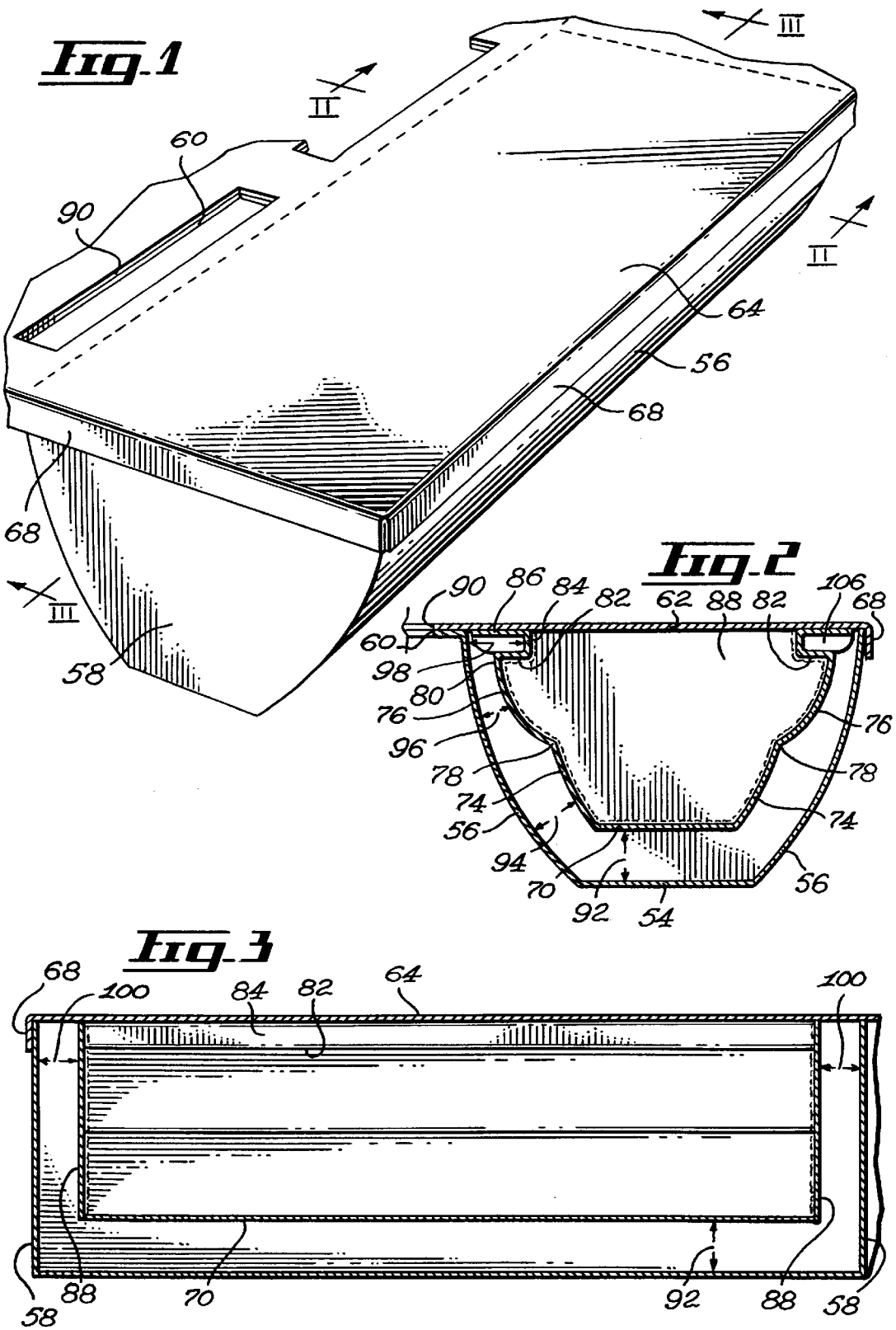

EDIBLE BUN HAVING A COMPARTMENTED CENTRAL RECESS

BACKGROUND

1. Field of the Invention

The present invention relates to the field of edible baked products and is more particularly concerned with a substantially elongated bun of the so-called hot dog type having a configuration which defines a centrally located food receiving recess. The central recess has pair of superposed longitudinal compartments for receiving a variety of edible fillings. The present invention also relates to a mold for producing the bun.

2. Prior Art

The field of edible baked products is replete with baked buns having various configurations. One popular type of bun is the so-called "hot dog" bun. The term "hot dog" is commonly used in North America to designate a relatively small sausage made of beef, pork, or the like.

The "hot dog" is normally eaten in accompaniment with the so-called hot dog bun. The conventional hot dog bun consists of an elongated bun having a longitudinal slot formed on one of its surface. The hot dog is adapted to be inserted in the longitudinal slot.

However, depending on the type of bread, the type of hot dog and the way the longitudinal slot is made in the bun, the hot dog may be more or less adequately fitted in the longitudinal slot. Consequently, when the hot dog is inserted in the longitudinal slot, the bun sometimes crumbles or beaks apart. Also, it is not uncommon to have the hot dog slip out of the bun while it is being eaten.

This problem is well recognized and, accordingly, various types of hot dog bun and corresponding molds for forming the buns have been proposed to solve the problem.

Examples of such buns and corresponding molds are disclosed in U.S. Pat. No. 4,047,477 granted to Julius B. Berke on Sep. 13$^{th}$, 1977; U.S. Pat. No. 4,190,229 granted to David R. Bradshaw on Feb. 26$^{th}$, 1980; U.S. Pat. No. 4,065,581 granted to Heiderpriem on Dec. 27$^{th}$, 1977 and U.S. Pat. No. 4,214,517 granted to Oscar D. Caldwell on Jul. 29$^{th}$, 1980.

All of these patents disclose elongated hot dog types of buns wherein the longitudinal slot formed in hot dog buns is replaced with a preformed centrally disposed cavity.

The preformed centrally disposed cavity disclosed in the above mentioned patents are adapted to better hold the hot dog sausage and prevented it from slipping out of the bun when it is being consumed.

Some of these patents are also concerned with the spilling of relatively liquid fillings such as chili, sauce or condiments such as relish, mustard and ketchup which are often poured in the slot, on top of the hot dog.

However, the bun configurations disclosed in the prior art documents suffer from a set of major drawbacks.

Some of these documents, like U.S. Pat. No. 4,065,581, and Canadian Patent 600,072 merely disclose a bun having a central recess. Any chili, sauce or condiments introduced into the recess will have a tendency to be squeezed out of the latter when the bun is manipulated and chewed upon. The chili, sauce or condiments will simply run up the lateral walls forming the recess and flow over these peripheral edges.

U.S. Pat. No. 4,214,517 proposes a bun having not only a longitudinal cavity but also a peripheral lip adapted to partially close off the cavity.

However, the peripheral lip obstructs the insertion of food into the cavity.

SUMMARY OF THE INVENTION

Accordingly, it is an object of the present invention to provide an improved edible bun.

It is also an object of the present invention to provide an improved mold for forming an improved edible bun.

The edible bun in accordance with an embodiment of the present invention will prevent food such as condiments inserted into its food receiving cavity from spilling out of the bun.

The bun in accordance with an embodiment of the present invention will allow for easy insertion of food into its food receiving cavity.

The bun in accordance with an embodiment of the present invention will have a food receiving cavity which is segmented into a pair of superposed compartments.

The bun in accordance with an embodiment of the present invention will be deformable between an opened configuration wherein it facilitates insertion into its food receiving cavity and a closed configuration wherein it prevents the food inserted in its food receiving cavity from pouring out of the food receiving cavity.

The mold in accordance with an embodiment of the present invention will allow for the easy and economical manufacturing of a bendable bun having a centrally located double compartment central food receiving cavity.

In accordance with an embodiment of the present invention there is thus provided an edible bun comprising: a base wall, said base wall having a substantially elongated configuration, said base wall having a pair of base walls longitudinal edges and a pair of base wall transversal edges, a pair of side walls, said side walls extending generally upwardly from said base wall longitudinal edges, a pair of end walls, said end walls extending generally upwardly from said base wall transversal edges, said base wall, said pair of side walls, and said pair of end walls defining an open top food receiving cavity, each one of said side walls having a side wall lower section and a side wall upper section, each one of said wall lower section extending from one of said base wall longitudinal edges to a side wall lower section upper peripheral edge, each one of said side wall upper section extending integrally from one of said side wall lower section upper peripheral edge, said side wall lower sections having a side wall lower section thickness, said side wall upper section having a side wall upper section thickness, said side wall lower section thickness being relatively greater than said side wall upper section thickness.

Preferably, each one of said side wall upper section has a side wall upper section upper peripheral edge and each one of said side wall further comprises a retaining lip, each retaining lip extending integrally and substantially inwardly from one of said side wall upper section upper peripheral edge in a direction substantially parallel to said base wall, each one of said retaining lips extending partially over said open top food receiving cavity.

Conveniently, each one of said side wall lower section has a side wall lower section outer surface and a side wall lower section inner surface, each one of said side wall lower section inner surfaces bending integrally towards said corresponding side wall lower section outer surface at a thinning location positioned adjacent said side wall lower section upper peripheral edge.

Preferably, said bun is made out of a relatively flexible material and said side walls upper section are bendable about a bending location positioned adjacent said side walls lower section upper peripheral edges, said side wall upper sections being movable between an opened configuration wherein said retaining lips are spaced relatively to one another and a closed configuration wherein said retaining lips are abuttingly in contact with each other.

In accordance with the present invention, there is also provided a baking mold for forming an edible bun, said baking mold comprising: a base portion, said base portion having a generally flat base portion top surface, said base portion having at least one female mold recess formed in said base portion top surface, said at least one female mold recess having a generally elongated configuration, said at least one female mold recess having a female mold recess base wall, said female mold recess base wall having a pair of female mold recess base wall longitudinal edges and a pair of female mold recess base wall transversal edges, said at least one female mold recess also having a pair of female mold recess side walls extending substantially upwardly from said female mold recess base wall longitudinal edges and a pair of female mold end walls extending substantially upwardly from said female mold recess transversal edges, a lid portion, said lid portion having a substantially flat lid cover plate, said lid cover plate having a lid cover plate lower surface, said lid portion having at least one male shaping member rigidly secured to said cover plate lower surface, said at least one male shaping member being complementarily positioned inside for reception within said at least one female mold recess of said base portion when said lid portion is superposed thereon, said at least one male shaping member having a generally elongated configuration, said at least one male shaping member having a substantially flat shaping member base wall, said shaping member base wall having a pair of shaping member base wall longitudinal edges and a pair of shaping member base wall transversal edges, said at least one male shaping member also having a pair of shaping members side walls extending substantially upwardly from said shaping member base wall longitudinal edges and a pair of shaping member end walls extending substantially upwardly from said shaping member base wall transversal edges, each one of said shaping member side walls having a shaping member side wall lower segment and a shaping member side wall upper segment, each shaping member side wall lower segment extending integrally from a shaping member base wall longitudinal edges to a shaping member side wall lower segment upper peripheral edge, each shaping member side wall upper segment extending integrally from a shaping member side wall lower segment upper peripheral edge, said shaping member side wall lower sections being spaced from each other by a shaping member side wall lower section spacing, said shaping member side wall upper sections being spaced from each other by a shaping member side wall upper section spacing, said shaping member side wall lower section spacing being relatively smaller than said shaping member side wall upper section spacing.

Preferably, said shaping member side walls have a generally downwardly converging arcuate configuration and each one of said side wall upper section and said side wall lower section also have a generally downwardly converging arcuate configuration, the intersection of said shaping member side wall upper segments and said shaping members side wall lower segments at said shaping member side wall lower segment upper peripheral edges thus forming an inwardly oriented ridge.

Conveniently, each shaping member side wall upper section has a shaping member side wall upper section upper peripheral edge and each shaping member side wall upper section bends integrally at said shaping member side wall upper section upper peripheral edge into an upper section inwardly oriented lip, said upper section inwardly oriented lip extending inwardly towards each other in a plane substantially parallel to said shaping member base wall, each upper section inwardly oriented lip bending integrally into an upper section spacing segment, said upper section spacing segments extending substantially perpendicularly to said upper section inwardly oriented lips, each upper section spacing segment bending integrally into an upper section outwardly oriented lip.

BRIEF DESCRIPTION OF THE DRAWINGS

An embodiment of the present invention will now be described, by way of example, in reference to the following drawings in which:

FIG. 1 in a perspective view illustrates a mold unit part of a baking mold in accordance with an embodiment of the present invention;

FIG. 2 in a transversal cross-sectional view taken along arrows 2—2 of FIG. 1 illustrates the cross-sectional configuration of a baking unit part of a baking mold in accordance with an embodiment of the present invention;

FIG. 3 in a longitudinal cross-sectional view taken along arrows 3—3 of FIG. 1 illustrates the longitudinal cross-sectional configuration of a baking unit part of a baking mold in accordance with an embodiment of the present invention;

DETAILED DISCRIPTION

Figure 8:
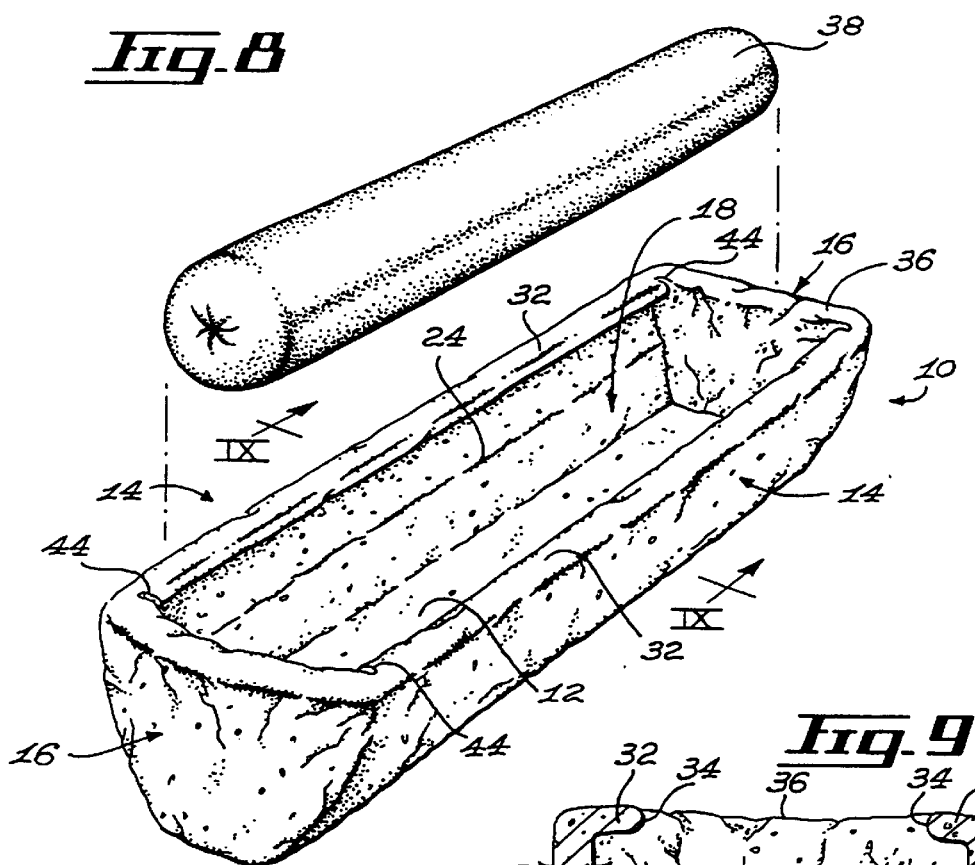
FIG. 8 in a perspective view illustrates a hot dog type sausage about to be inserted into a hot dog-type bun in accordance with an embodiment of the present invention.
Figure 9:
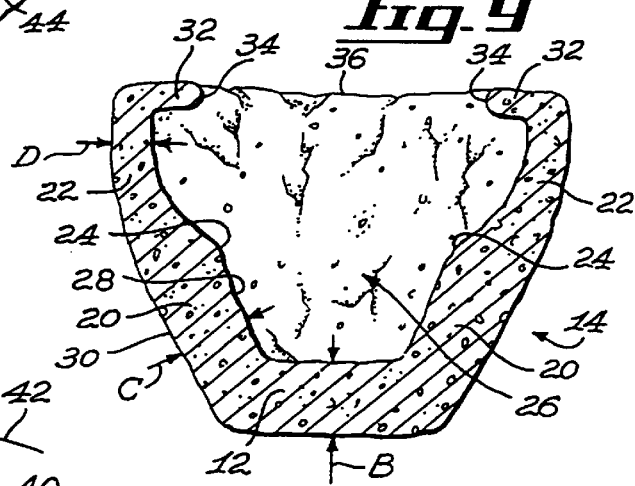
FIG. 9 in a transversal cross-sectional view taken along arrows 9—9 of FIG. 8 illustrates a hot dog-type bun in accordance with an embodiment of the present invention in its open configuration.
Figure 10:
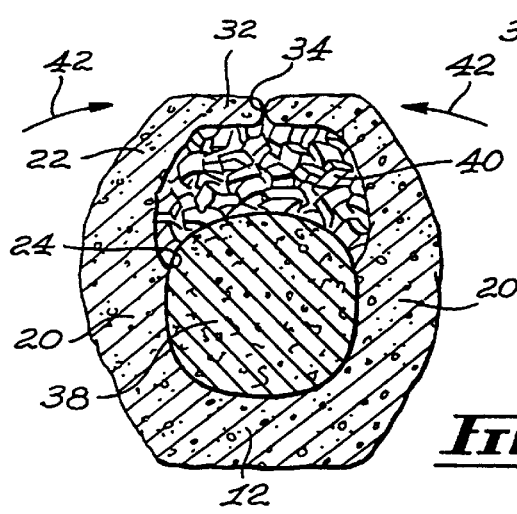
FIG. 10 in a transversal cross-sectional view illustrates a hot dog-type bun in accordance with an embodiment of the present invention with a sausage and condiments inserted into its food receiving cavity, the hot dog-type bun being in its closed configuration.

Referring to FIGS. 8 through 10, there is shown a bun 10 in accordance with an embodiment of the present invention. The bun 10 has a generally elongated configuration. The bun 10 has a bottom wall 12, a pair of integrally extending side walls 14 and a pair of integrally extending end walls 16.

Each side wall 14 extends substantially upwardly and outwardly from a longitudinal edge of the bottom wall 12. Each end wall 16 extends integrally and substantially perpendicularly from a longitudinal end peripheral edge of the bottom wall 12. The bottom wall 12, the side walls 14 and the end walls 16 all merge integrally with each other in order to form an open-top food receiving cavity 18.

One of the main features of the present invention resides in the configuration of the side walls 14. Referring now more specifically to FIGS. 9 and 10, each side wall 14 has a side wall lower section 20 and a side wall upper section 22. The bottom wall 12 has a thickness indicated in FIG. 9 by the reference letter B. The side wall lower sections 20 have a thickness indicated in FIG. 9 by the reference letter C. The respective thickness B and C of the bottom wall 12 and side wall lower sections 20 have substantially the same value. Each side wall lower section 20 has a side wall lower section upper peripheral edge 24. The bottom wall 12, the side wall lower sections 20 and a first compartment segment of the end walls 16 all form an open top first compartment 26 of the food receiving cavity 18. The first compartment segment of the end walls 16 extends from the bottom wall 12 to the side wall lower section upper peripheral edges 24.

The side wall upper sections 22 extend integrally from the side wall lower sections 20. Each side wall lower section 20 has an interior surface 28 and an exterior surface 30. The interior surface 28 of each side wall lower section 20 bends outwardly towards the corresponding exterior surface 30 of the same side wall lower section 20 at the side wall lower section upper peripheral edge 24. The side wall upper sections 22 thus have a thickness indicated by the reference letter D in FIG. 9, which is substantially smaller than the thickness C of the side wall lower sections 20.

Each side wall upper section 22 extends integrally into a substantially perpendicular retaining lip 32. The retaining lips 32 extend inwardly towards each other. The retaining lips 32 extend integrally from one end wall 16 to the other. Each retaining lip 32 has a corresponding longitudinal abutment edge 34. Each end wall 16 has an upper peripheral edge 36. The side wall upper sections 22, the retaining lips 32, and a segment of the end walls 16 extending from the side wall lower section upper peripheral edges 24 to the end wall upper peripheral edges 36, in combination, define an opened top and an opened bottom, second compartment 35 of the food receiving cavity 18.

The food receiving cavity 18 is thus divided into a first compartment 26 and a superposed second compartment 35. The first compartment 26 has an open top configuration while the second compartment 35 has both an open top and an open bottom configuration. The second compartment 35 extends integrally from the peripheral walls of the first compartment 26.

In use, the bun 10 is adapted to receive both a sausage such as the hot dog 38 and a volume of relatively fluid condiments indicated by the reference numeral 40 in FIG. 10. The hot dog 38 is adapted to be fittingly inserted in the first compartment 26. The condiments 40 are adapted to be poured on top of the hot dog 38 and contained by the second compartment 35.

In order to prevent spilling of the condiments 40, the second compartment 35 is adapted to be moved between an opened configuration illustrated in FIG. 9 and a closed configuration illustrated in FIG. 10.

When the bun 10 is not biased by any external forces, it assumes the so-called opened configuration of FIG. 9. In this opened configuration, the bottom wall 12, the side wall lower section 20 and the side wall upper section 22 form a substantially "U"-shaped cross-sectional configuration. The outer surfaces of the side walls 14 extend in a relatively straight line in an upward and outward direction away from the bottom wall 12. The retaining lips 32 are spaced from each other by a spacing which allows for the insertion of both the hot dog 38 and the condiments 40 into their respective compartments 26 and 35.

In order to move the second compartment 35 from its opened configuration illustrated in FIG. 9 to its closed configuration illustrated in FIG. 10, a user merely needs to exert a squeezing action on the exterior surface of the side wall upper sections 22. The squeezing action is illustrated by the arrows 42 in FIG. 10.

The bun 10 being made of relatively resilient comestible material such as dough, the squeezing action on the exterior surface of the side wall upper sections 22 will cause the side wall upper sections 22 to bend towards each other.

The specific geometry of the side walls 14 and the resilient nature of the bun will permit the walls to bend about the side wall lower section upper peripheral edges 24. Indeed, since the interior surface 28 of each side wall lower section 20 bends outwardly towards the corresponding exterior surface 30 of the same side wall 20, the side wall lower section upper peripheral edges 24 mark a transition between the thicker lower sections 20 and the thinner upper sections 22. The side wall upper sections 22 will thus have a tendency to bend about the side wall lower section upper peripheral edges 24.

The bending of the side wall upper sections 22 will cause the retaining lips 32 to move towards each other until their respective abutment edges 34 contact each other, as illustrated in FIG. 10. When the abutment edges 34 abut against each other, the retaining lips 32 prevent the condiments 40 from flowing out of the bun 10. The specific configuration of the side walls 14 thus allow for a bun 10 which is adapted to adopt either an open configuration or a closed configuration. In the open configuration the bun 10 defines a top spacing between its side walls 14 which allows for the easy pouring of fillings into its food receiving cavity. In the closed configuration, the bun 10 is adapted to prevent the fillings from flowing out of its food receiving cavity.

In the embodiment illustrated in FIG. 8, a set of transversal slots 44 are formed in the retaining lips 32 adjacent the end walls 16. The slots 44 extend partially across the retaining lips 32 from the corresponding longitudinal abutment edge 34. The slots 44 extend in a direction substantially parallel to the end walls 16, The slots 44 are adapted to prevent the tearing of the retaining lips 32 during the manufacturing process of the bun 10. The slots 44 are adapted to allow the retaining lips 32 to resiliently pivot when a male shaping member 68 which will be described here and after is removed during the unmolding step of the manufacturing process.

Figure 11:
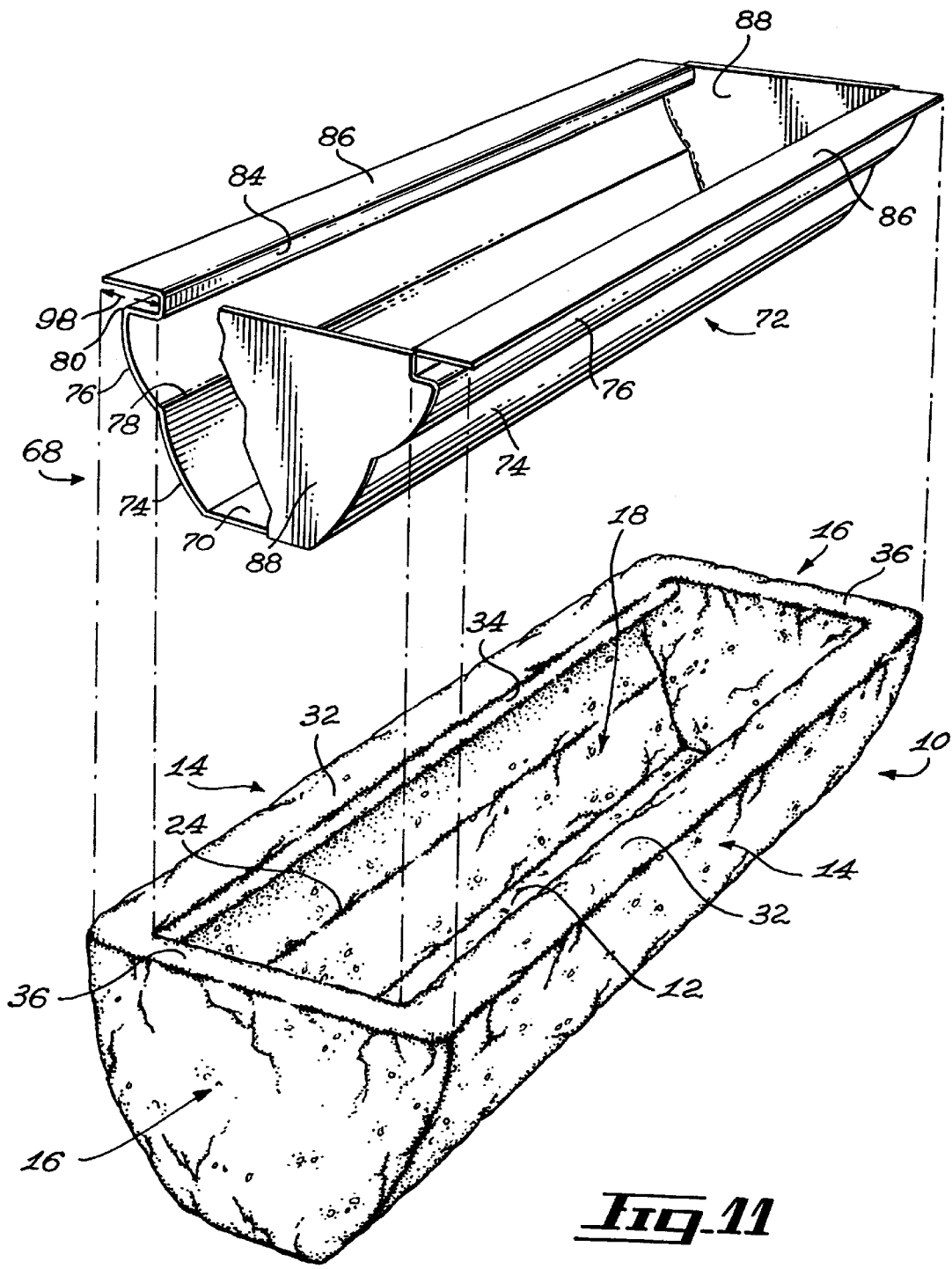
FIG. 11 in a perspective view illustrates a mold unit part of a baking mold in accordance with an alternative embodiment of the present invention and a hot dog-type bun also in accordance with an alternative embodiment of the present invention.

Referring now more specifically to FIG. 11, there is shown a bun 10' in accordance with an alternative embodiment of the present invention. The bun 10' is substantially similar to the bun 10 illustrated in FIGS. 8 through 10. The only difference between the bun 10' of FIG. 11 and the bun 10 of FIGS. 8 through 10 is that the retaining lips 32 of the bun 10' extend integrally from one end wall 36 to the other without any transversal slot 44. The bun 10' is made of a suficiently resilient material which prevents the tearing of the retaining lips 32 during the unmolding step of the manufacturing process.

Referring now more specifically to FIGS. 1 through 7, there is shown a mold in accordance with an embodiment of the present invention.

The mold in accordance with an embodiment of the present invention has a base portion 46 and a lid portion 48. The base portion 46 includes a generally flat base portion top surface 50. The base portion top surface 50 is provided with a set of rows of spaced apart female mold recesses 52. The female mold recesses 52 correspond in configuration and size to the exterior surface of the walls 12 and 14 of the bun 10 illustrated in FIGS. 8 through 10.

Each female mold recess 52 has a substantially elongated general configuration. Each female mold recess 52 has a substantially flat base portion base wall 54. A pair of base portion side walls 56 extend integrally and substantially upwardly from the longitudinal peripheral edges of the base portion base wall 54.

The base portion side walls 56 have a generally downwardly converging arcuate configuration. Each base portion side wall 56 defines an arc segment which extends upwardly and outwardly away from a base portion base wall 54. Each female mold recess 52 also has a pair of opposed base portion longitudinal end walls 58. The base portion longitudinal end walls 58 are correpondingly shaped in order to merge integrally into the base portion side walls 56 and the base portion base wall 54 of a given female mold recess 52.

The female mold recesses 52 are spaced from each other by segments of the base portion top surface 50. The base portion top surface 50 has a set of substantially rectangularly shaped extension apertures 60 extending therethrough.

The lid portion 48 has a substantially flat lid cover plate 62. The lid cover plate 62 has a top surface 64 and a bottom surface 66. The lid cover plate 62 also has a depending flange 68 extending integrally and substantially perpendicularly from its peripheral edges. The flange 68 is adapted to be in slidable contacting relation with the upper peripheral edges of the base portion 46 when the lid portion 48 is superposed thereon. The main purpose of the flange 68 is to ensure that the lid portion 48 is in register with the base portion 46.

A set of male shaping members 68 are rigidly secured to the bottom surface 66 of the lid cover plate 62. The male shaping members 68 are complementarly positioned and sized for reception within the female mold recesses 52 of the base portion 46 when the lid portion 48 is superposed thereon, as illustrated in FIG. 2.

Each male shaping member 68 has a substantially elongated general configuration. Each male shaping member 68 has a substantially flat shaping member base wall 70. A pair of shaping members side walls 72 extends integrally and substantially upwardly from the longitudinal peripheral edges of the shaping member base wall 70.

One of the main features of the present invention resides in the specific configuration of the shaping member side walls 72.

The shaping member side walls 72 have a generally downwardly converging arcuate configuration. The shaping member side walls 72 are divided into two main segments, each segment also having a generally downwardly converging arcuate configuration. Each shaping member side wall 72 has a shaping member side wall lower segment 74 and a shaping member side wall upper segment 76.

Each shaping member side wall lower segment 74 extends integrally and substantially upwardly from a corresponding longitudinal peripheral edge of a shaping member base wall 70. Each shaping member side wall lower segment extends from the shaping member base wall 70 to a shaping member side wall lower segment upper peripheral edge 78.

Each shaping member side wall upper segment 76 extends integrally from a corresponding shaping member side wall lower segment upper peripheral edge 78. Each shaping member side wall upper segment 76 also has a downwardly converging substantially arcuate configuration. The intersection of the shaping member side wall upper segment 76 and the shaping member side wall lower segment 74 at the shaping member side wall lower segment upper peripheral edge 78 thus forms an inwardly oriented ridge. Each shaping member side wall upper section 76 has a shaping member side wall upper section upper peripheral edge 80. Each shaping member side wall upper section 76 thus extends from a corresponding shaping member side wall lower section upper peripheral edge 78 to a corresponding shaping member side wall upper section upper peripheral edge 80.

Each shaping member side wall upper section 76 bends integrally at its shaping member side wall upper section upper peripheral edge 80 into an upper section inwardly oriented lip 82. The upper section inwardly oriented lips 82 of a given shaping member 68 thus extend inwardly towards each other in a plane substantially parallel to the shaping member base wall 70. Each upper section inwardly oriented lip 82 bends integrally into an upper section spacing segment 84. The upper section spacing segments 84 extend substantially perpendicularly to the upper section inwardly oriented lips 82. Each upper section spacing segment 84, in turn, bends integrally into an upper section outwardly oriented lip 86. Each male shaping member 68 also has a pair of opposed shaping member longitudinal end walls 88. The shaping member longitudinal end walls 88 are correspondingly shaped in order to merge integrally with the adjacent shaping member base wall 70 and the shaping member side walls 72.

The lid cover plate 62 has a set of substantially rectangularly shaped extension apertures 90 extending therethrough. As illustrated more specifically in FIG. 1, when the lid portion 48 is superposed on the base portion 46, the extension apertures 60 extending through the base portion top surface 50 are adapted to be in register with the extension apertures 90 extending through the lid cover plate 62.

As mentioned previously, the male shaping members 68 are adapted to be inserted inside the corresponding female mold recesses 52 when the lid portion 48 is superposed on the base portion 46. When the lid portion 48 is superposed on the base portion 46, each pair of female mold recess 52 and corresponding male shaping member 68 inserted therein creates a mold cavity adapted to form a corresponding bun such as the bun 10 illustrated in FIGS. 8 through 10.

The spacing between each pair of female mold recess 52 and its corresponding male shaping member 68 inserted therein is divided into a set of spacing segments. A base spacing segment 92 is created between the shaping member base wall 70 and the base portion base wall 54. The base spacing segment 92 is adapted to form the bottom wall 12 of the bun 10.

A pair of side wall lower section spacing segments 94 are created between the shaping member side wall lower segments 74 and a corresponding adjacent region of the base portion side walls 56. The side wall lower section spacing segments 94 are adapted to form the side wall lower sections 20 of the bun 10. The width of the spacings 94 corresponds substantially to the width identified by the reference letter C of the side wall lower sections 20 of the bun 10.

A pair of side wall upper section spacing segments 96 are created between the side wall upper segments 76 and the corresponding adjacent segment of the base portion side walls 56. The side wall upper section spacing segments 96 are adapted to form the side wall upper sections 22 of the bun 10. The width of the side wall upper section spacing segments 96 correspond substantially to the width indicated by the reference letter D in FIG. 9 of the side wall upper sections 22 of the bun 10.

An upper lip spacing segment 98 is delimited by the upper section inwardly oriented lip 82, the upper section spacing segment 84, the upper section outwardly oriented lip 86 and the corresponding adjacent section of the base portion side walls 56. The upper lip spacing segments 98 are adapted to form the retaining lips 32 of the bun 10.

A pair of longitudinal end spacing segments 100 are delimited on each longitudinal side of a given male shaping member 68 by the base portion longitudinal end walls 58 and an adjacent shaping member longitudinal end wall 88.

The base portion top surface 50 has a pair of integrally extending prehension handles 102. The lid cover plate 62 has a pair of corresponding integrally extending prehension handles 104.

Figure 4:
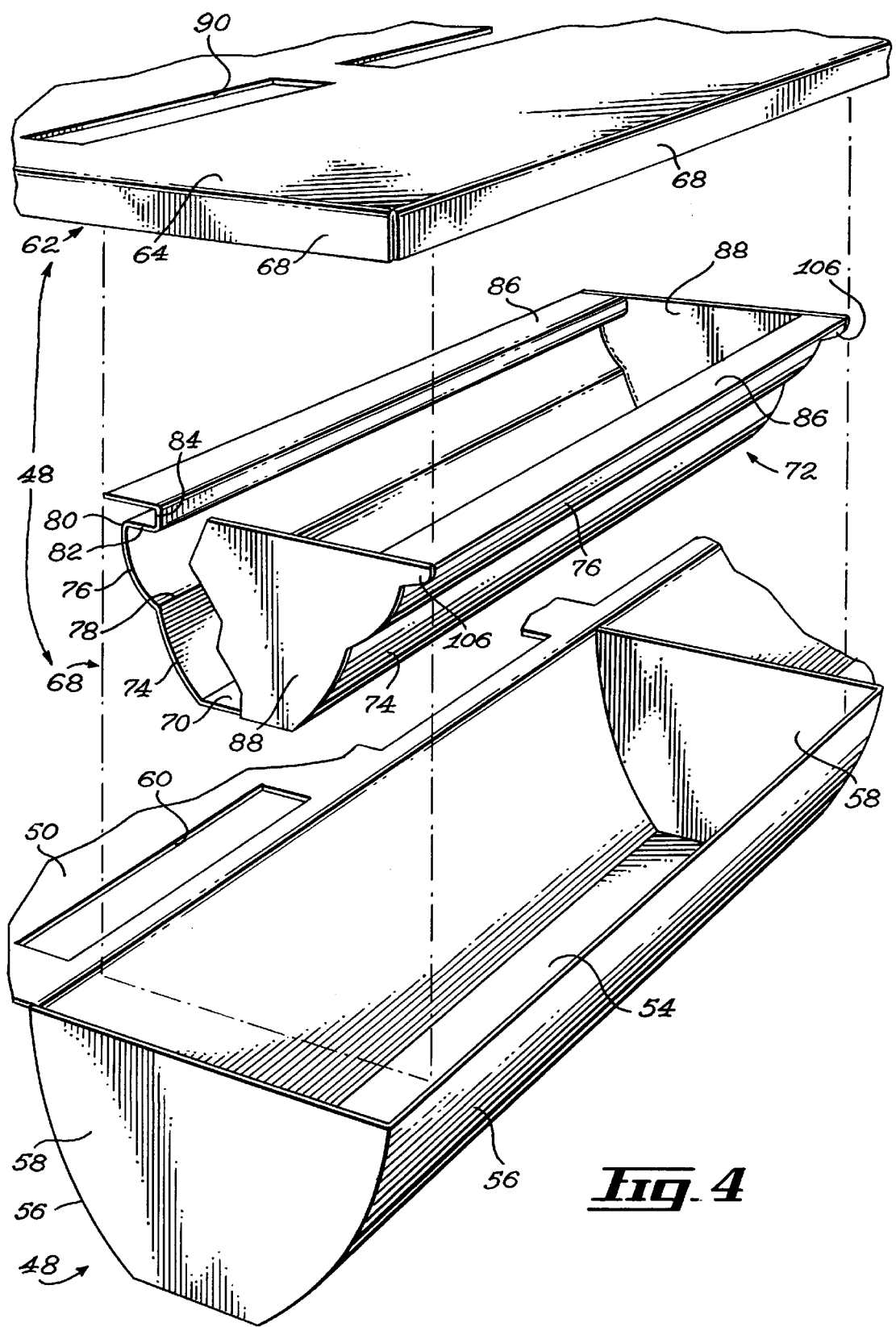
FIG. 4 in a perspective exploded view illustrates a baking unit part of a baking mold in accordance with an embodiment of the present invention.
Figure 5:
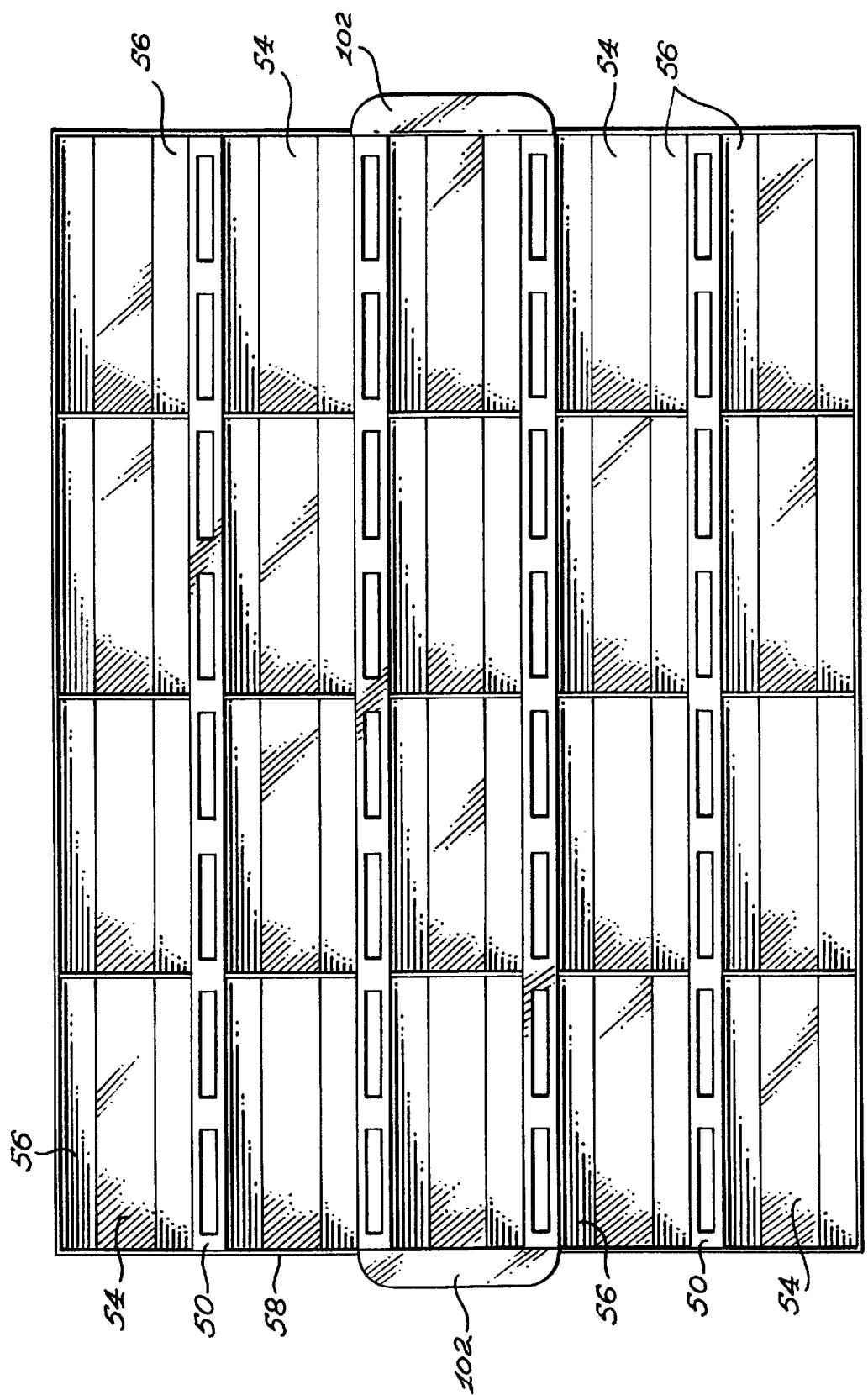
FIG. 5 in a top view illustrates a base portion part of a baking mold in accordance with an embodiment of the present invention.
Figure 6:
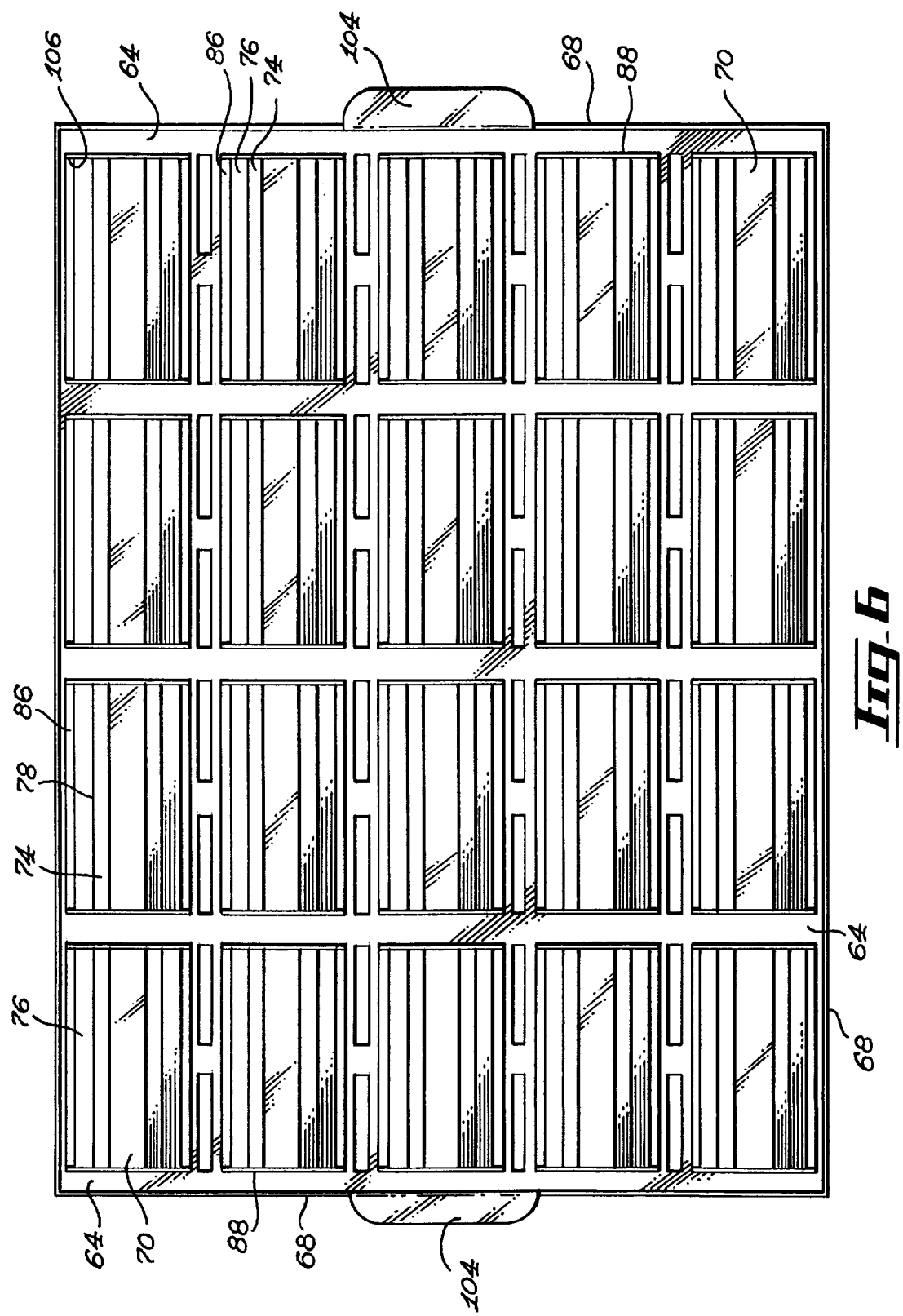
FIG. 6 in a bottom view illustrates a lid portion part of a baking mold in accordance with an embodiment of the present invention.
Figure 7:
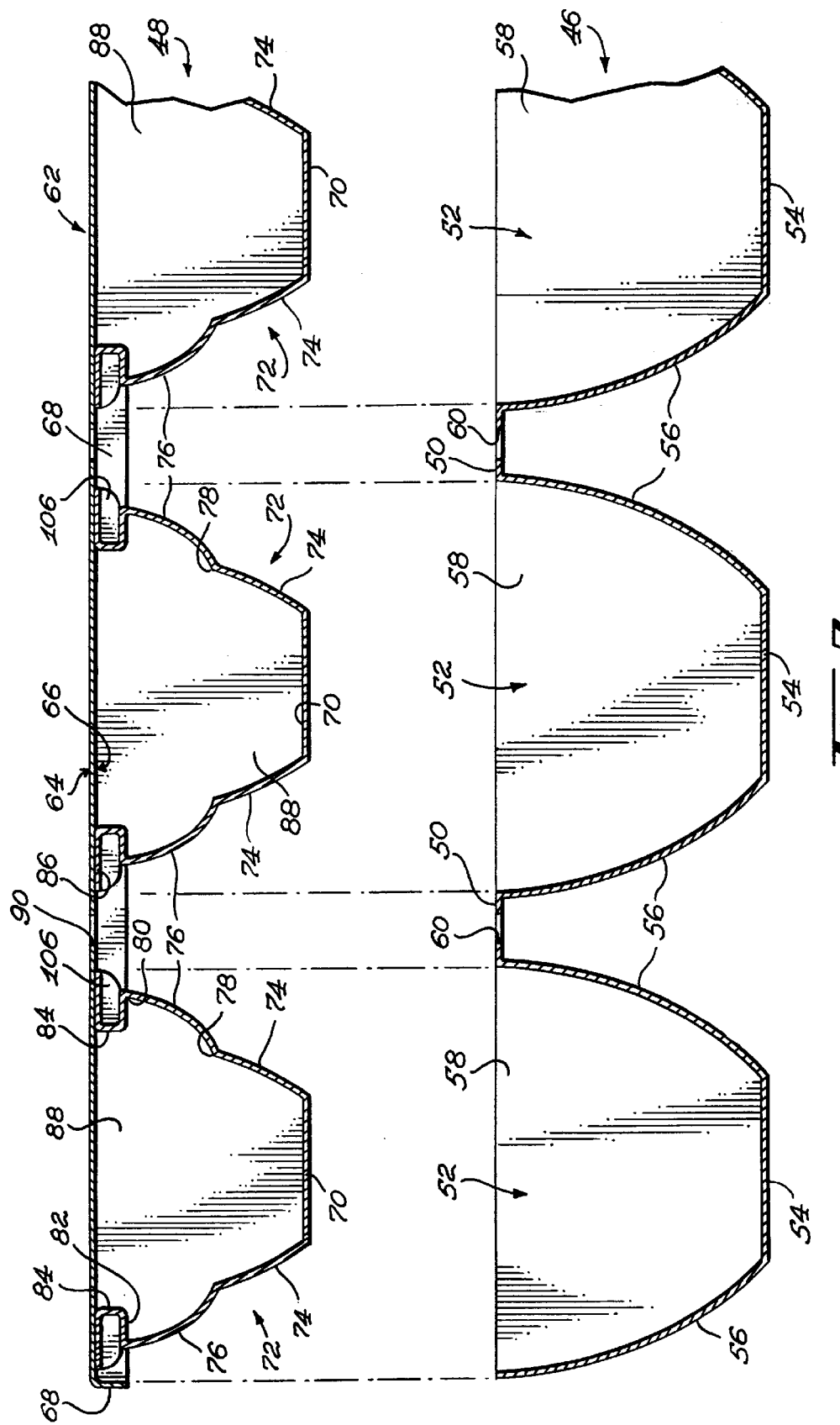
FIG. 7 in a partial transversal cross-sectional view illustrates a portion of a baking mold in accordance with an embodiment of the present invention with the lid portion removed from the based portion.

The embodiment illustrated in FIGS. 5 and 6 uses four rows, each row being composed of four pairs of female mold recesses 52 and four corresponding male shaping members 68. It is to be understood that the overall geometry of the mold in accordance with the present invention which depends on the number of rows and the number of mold units per rows is adapted to vary depending on the specific operating conditions and that the number of mold units may vary without departing from the scope of the invention.

In use, in order to form a set of buns such as the bun 10 illustrated in FIGS. 8 through 10, the female mold recesses are filled with the appropriate quantity of bun forming dough. The lid portion 48 is then superposed on top of the base portion 46 with the bottom surface 66 of the lid cover plate 62 abuttingly resting on the base portion top surface 50. As mentioned previously, the flanges 68 are positioned in slidable contacting relation with the upper peripheral edges of the base portion 46 thus ensuring that the lid portion 48 is properly in register with the base portion 46 and that the extension apertures 60 extending through the base portion top surface 50 are in register with the expansion apertures 90 extending through the lid cover plate 62. The assembled baking mold and the dough are then baked in an oven, not shown.

During the baking operation, the dough will rise inside the spacing segments 92, 94, 96, 98 and 100 defined between each pair of female mold recess 52 and the corresponding male shaping member 68 inserted therein. Once the baking operation is over, the resulting buns will have the general configuration of the bun 10 in accordance with the present invention and illustrated in FIGS. 8 through 10.

In the embodiment illustrated in FIGS. 1 through 7, each end wall 88 also has a cutting segment 106 extending integrally into a corresponding upper lip spacing segment 98. The cutting segments 106 are adapted to form the transversal slots 44 in the retaining lips 32 of the bun 10.

Referring now more specifically to FIG. 11, there is shown a male shaping member 68' part of a baking mold in accordance with an alternative embodiment of the present invention. The male shaping member 68' is substantially identical to the male shaping member 68 of the previous embodiment except for the fact that the male shaping member 68' has a pair of end walls 88 which do not extend into the upper lip spacing segments 98.

The embodiments of the invention in which an exclusive privilege or property is claimed are defined as follows:

1. An edible bun comprising:
   a base wall, said base wall having a substantially elongated configuration, said base wall having a pair of base wall longitudinal edges and a pair of base wall transversal edges,
   a pair of side walls, said side walls extending generally upwardly from said base wall longitudinal edges,
   a pair of end walls, said end walls extending generally upwardly from said base wall transversal edges, said base wall, said pair of side walls, and said pair of end walls defining an open top food receiving cavity, each one of said side walls having a side wall lower section and a side wall upper section, each one of said side wall lower sections extending upwardly from one of said base wall longitudinal edges to a respective side wall lower section upper peripheral edge, each one of said side wall upper sections extending integrally from a respective one of said side wall lower section upper peripheral edges, each one of said side wall upper sections having a side wall upper section upper peripheral edge, each one of said side walls having a retaining lip, each of said retaining lips extending integrally and substantially inwardly from a respective one of said side wall upper section upper peripheral edges in a direction substantially parallel to said base wall, each one of said retaining lips extending partially over said open top food receiving cavity, said retaining lips being spaced apart by a distance larger than a distance between said side wall lower sections, said side wall lower sections each having a side wall lower section thickness, said side wall upper sections each having a side wall upper section thickness, said side wall lower section thickness being greater than said side wall upper section thickness, said open top food receiving cavity having, in an open position, a closed bottom open top lower sausage receiving compartment between said side wall lower sections and an open bottom open top upper condiment receiving compartment between said side wall upper sections, each of said side wall upper sections being bendable about a bending location positioned adjacent each of said side wall lower section upper peripheral edges, each of said side wall upper sections being movable between an open configuration wherein said retaining lips are spaced from one another an a closed configuration wherein said retaining lips are abuttingly in contact with each other, said side wall lower sections being spaced apart a distance sufficient to accommodate a sausage in said lower sausage receiving compartment, said side wall upper sections being spaced apart a greater distance than said side wall lower sections such that when side wall upper sections are moved to said closed configuration wherein said retaining lips are in abutting contact, said side wall upper sections remain sufficiently spaced apart to maintain space in said upper condiment receiving compartment for condiments.

2. An edible bun as recited in claim 1, wherein each one of said side wall lower sections has a side wall lower section outer surface and a side wall lower section inner surface, each one of said side wall lower section inner surfaces bending integrally towards said corresponding side wall lower section outer surface at a thinning location positioned adjacent said side wall lower section upper peripheral edge.

3. An edible bun as recited in claim 2 wherein each of said side wall lower section outer surfaces extends upwardly and outwardly from said base wall when said bun is in an open position.

4. An edible bun as recited in claim 1 wherein each of said retaining lips extends between said end walls, a slot being formed between each end of each of said retaining lips and a respective end wall.

* * * * *